No. 823,382. PATENTED JUNE 12, 1906.
A. AKESON.
CARBURETER.
APPLICATION FILED FEB. 17, 1905.
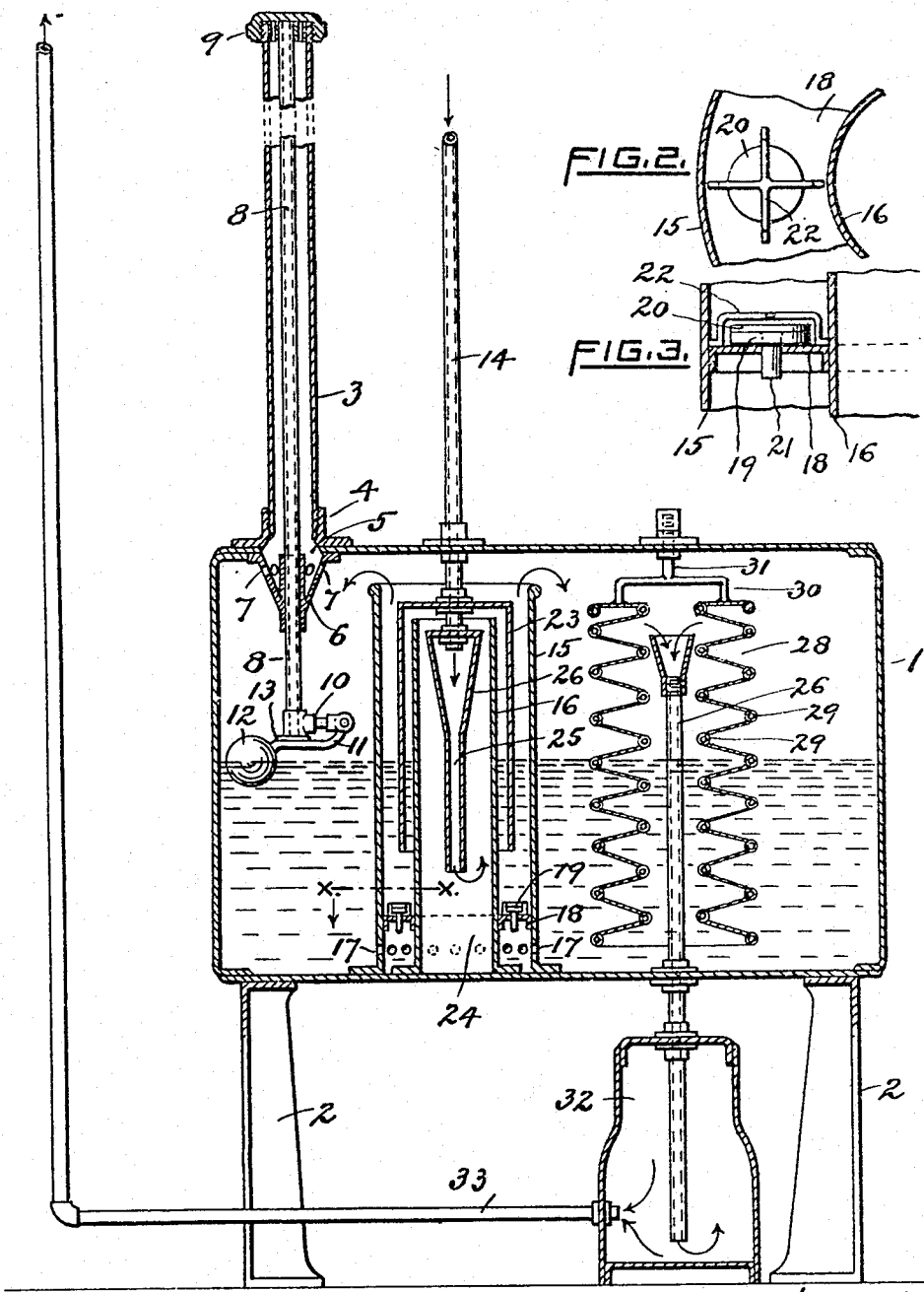
WITNESSES. FIG. 1. INVENTOR.
Anders Akeson.

UNITED STATES PATENT OFFICE.

ANDERS AKESON, OF WORCESTER, MASSACHUSETTS, ASSIGNOR TO STANDARD GAS & HEATING COMPANY, OF WORCESTER, MASSACHUSETTS.

CARBURETER.

No. 823,382.      Specification of Letters Patent.      Patented June 12, 1906.

Application filed February 17, 1905. Serial No. 246,178.

*To all whom it may concern:*

Be it known that I, ANDERS AKESON, a citizen of the United States, residing at the city of Worcester, in the county of Worcester and State of Massachusetts, have invented certain new and useful Improvements in Carbureters, of which the following is a specification.

My invention relates to an improved carbureter designed for the manufacture of illuminating-gas from hydrocarbon oils and of the class of carbureters that are buried in the ground.

My invention consists of the novel construction, arrangement, and combination of parts, as hereinafter described and claimed.

In the accompanying sheet of drawings, Figure 1 represents a view, partly in section and partly in elevation, of my improved carbureter. Fig. 2 is an enlarged sectional view on line $x\,x$ of Fig. 1, and Fig. 3 is a side elevation of the same.

Like reference characters indicate like parts.

1 designates a cylindrical tank which is supported by legs 2 2. A vent-pipe 3, which extends from the surface of the ground, is secured in the top of the tank by threaded connection with an annular flange 4, secured to said tank and surrounding a circular opening 5, formed in the same. A conical sleeve 6 is secured to and depends from the top of the tank 1, interiorly thereof, and in the smaller end portion of said sleeve, which is provided with perforations 7 7, is secured the oil-fill pipe 8, which extends within and the upper end of the vent-pipe 3. A removable cap 9 is arranged to close the upper ends of the vent-pipe 3 and fill-pipe 8, respectively, after the tank has been replenished with oil. The sleeve 6 is perforated to allow the gas to escape from the tank and out through the vent-pipe prior to refilling the tank with oil. On the lower end of the fill-pipe 8 is secured a bracket 10, whose outer end is bifurcated to receive the end of a swinging arm 11, which carries a ball-float 12.

On the arm of said float 12 is secured a circular cork disk 13, which forms a valve in closing the opening of the fill-pipe 8 when the liquid reaches its proper level within the tank.

A pipe 14 extends above the surface of the ground and is suitably supported by the top of the tank and depends within the same, as shown. This pipe 14 is arranged to receive air under pressure.

A carbureting-cylinder is mounted within the tank and comprises two vertically-arranged shells 15 16, concentric to each other and having their upper ends open and their lower ends secured to the bottom of the tank. In the shell 15 of the carbureting-cylinder near the bottom thereof is provided a circumferential row of perforations 17 17, and above these perforations between the shells of said cylinder is secured a transverse partition 18. Communication is established between the space on opposite sides of the partition 18 by means of diametrically-disposed openings, which are closed by cork disks 19 19. On each cork disk 19 is mounted a circular plate 20, which has a centrally-projecting stem 21 to fit loosely through each opening in the partition 18.

Two cross-arms that form a wire guard 22 overlie each valve of the carbureting-cylinder, and a space is provided between each wire guard and the top of each valve to permit the latter to rise from its seat, but not with sufficient movement as to permit the stem 21 to leave its opening in the partition 18. Thus accurate operation of each of these cork disk valves is assured.

An air-cylinder 23 is concentric with the carbureting-cylinder, extending between the shells 15 16 thereof, and said air-cylinder has a closed end which is above the open end of the shell 16 and is secured upon the depending portion of the air-pipe 14 within the tank. The lower portion of the air-cylinder 23 is always below the level of the liquid which passes from the tank through the perforations 17, uplifting the valves of the carbureting-cylinder and finding the same level between the shells of the same as in the tank. As the air-cylinder 23 is partially submerged in the liquid, the latter forms a seal to prevent the hydrocarbon vapor formed in the tank from entering said air-cylinder. The central portion of the carbureting-cylinder forms a condensation-chamber, as at 24, and an air-discharge pipe 25 communicates with this chamber near the bottom thereof. This discharge-pipe 25 terminates at its upper portion with an integral funnel-shaped extension 26, which projects centrally to the air-pipe 14, and this extension has a closed end by which said discharge-pipe 25 is supported by said pipe 14. The conical portion of the discharge-pipe 25 is so arranged to permit in forcing by the air-pressure in the pipe 14 the air moisture that may collect upon the inner surface of this conical portion of said pipe 25 down into the condensation-chamber 24, and thereby obtain a more dry air at the upper portion of the shell 15 of the carbureting-cylinder prior to entering the liquid. A vapor-outlet pipe 26 is secured within the tank 1, projecting through its bottom, where it is suitably supported, and said pipe 26 has a funnel-shaped mouth at its upper end.

Surrounding the outlet-pipe 26 is a collapsible vaporizer 28, comprising a bag-like structure of textile material, such as burlap, and preferably constructed of a series of flat-ring layers secured together on alternate edges constituting a succession of accordion folds.

Ratan hoops 29 29 are secured in the edges of the ring layers of burlap in such manner as to distend the same and give a permanent shape to the bag, as will be apparent from the drawings. This collapsible bag 28 is open at both ends and is supported by a yoke 30, properly secured to the upper ring layer of said bag and having an upwardly-extending stem 31, which is secured to the top of the tank. By capillary action that portion of the bag which extends above the level of the liquid is kept constantly saturated with the liquid and offers a very extended area for the evaporation of the liquid, so that the volatile elements quickly pass off into a gas vapor and which fills the upper portion within the tank. The vapor-outlet pipe 26 after passing through the bottom of the tank 1 discharges into a condensing-cylinder 32, and from said cylinder 32 this vapor or gas passes through a pipe 33 to the gas-burners of a building or to a gasometer. The vaporizer 28, being of absorbent material, raises the vapor of the hydrocarbon and holds it upon the extended portion above the liquid until it contains a full charge in a quiescent state; but the moment a draft is created in the outlet-pipes 26 33 the hydrocarbon contained in the distended portion of the vaporizer rapidly travels ahead and passes through said pipes 26 33 to the burner, and during the time the burner illuminates the said distended portion of the vaporizer above the oil-level continues to fill with hydrocarbon.

When the tank is to be refilled with liquid, the cap 9 is unscrewed from the pipe 3 to first allow of the escape of what gas there would be in the tank through the perforations of the sleeve 6 and out through the vent-pipe 3 to the atmosphere, after which the spout of a common funnel is inserted in the mouth of the fill-pipe 8 to permit the liquid to fill and find its proper level within the tank, as described.

When it is desired to free the bottom portion of the condensation-chamber 24 of moisture, a pump-out pipe (not shown) is inserted through the air-inlet pipe to withdraw such moisture.

What I claim, and desire to secure by Letters Patent, is—

1. In a carbureter, the combination of a tank adapted to contain a hydrocarbon liquid; a vent-pipe secured to the top of said tank, and communicating with an opening formed in the same; a conical sleeve secured to the top of and depending within the tank, said sleeve having its larger end surrounding the vent-opening and provided with perforations communicating with the same; a liquid-fill-pipe supported by the smaller end portion of said conical sleeve and projecting within the tank; a bracket secured on said fill-pipe, within the tank, and said bracket having an outer bifurcated portion; an arm pivotally mounted in the bifurcated portion of said bracket, and said arm carrying a ball-float thereon, and a cork disk mounted on said arm and adapted to close the discharge end of the fill-pipe after the refilled liquid has reached its proper level within the tank.

2. In a carbureter, the combination of a tank adapted to contain a hydrocarbon liquid; a carbureting-cylinder mounted in the tank and comprising two shells concentric to each other, having their upper ends open and extending above the liquid-level and their lower ends secured to the bottom of the tank, a partition between the shells near the bottom thereof, said partition provided with port-openings and a series of perforations formed in the outer shell and below said partition; cork disk valves mounted on the partition of said shells and each of said valves having a stem to project through each port-opening in said partition; a fixed wire guard for each of said valves; an air-inlet pipe secured to and projecting within said carbureting-cylinder, and said air-pipe supporting an air-cylinder having an open end adapted to extend within the liquid, between the shells of said carbureting-cylinder, and an air-discharge pipe within the inner shell of said carbureting-cylinder, and said last-named pipe having an integral conical portion whose larger end is closed and secured upon first-named air-pipe.

3. In a carbureter, the combination of a tank, horizontally arranged and adapted to contain a hydrocarbon liquid; two vertically-arranged cylindrical shells, concentric to each other, the outer shell provided with a series of perforations near its bottom portion, a check-valve to control passage of the liquid between the shells, each of said shells having their upper ends open and extending above the liquid-level and their lower ends secured to the bottom of the carbureter, and an air-inlet pipe secured to the top of the carbureter, depending within the latter and projecting below the open end of the inner shell.

4. In a carbureter, the combination of a tank adapted to contain a hydrocarbon liquid; an open-ended vertically-arranged carbureting-cylinder secured to the bottom of the tank and having a condensation-chamber and a hydrocarbon-chamber respectively, and a transversely-arranged valved flange secured in the liquid-chamber, near the bottom thereof, and said cylinder provided with perforations below its valved flange and communicating with the liquid-chamber of the tank; a pipe secured to and entering through the top of said cylinder and adapted to receive air under pressure; an air-discharge pipe in the condensation-chamber of said cylinder and having a closed end secured upon first-mentioned pipe, and said discharge-pipe having its closed end extending inwardly in conical form and which portion terminates with the main portion of said discharge-pipe; and a bell-shaped cylinder whose closed end is secured upon first-mentioned pipe, above the open end of said carbureting-cylinder, and said last-mentioned cylinder having its open end portion submerged in the liquid-chamber of first-mentioned cylinder.

5. In a carbureter, the combination of a tank adapted to contain a hydrocarbon liquid; a liquid-fill pipe entering the tank; means mounted on said pipe, arranged to automatically close the mouth of the same after the liquid has reached its proper level in the tank; a carbureting-cylinder having an open end extending above the liquid in the tank and provided with a condensation-chamber and a hydrocarbon-liquid chamber respectively, said cylinder having a valved flange near the bottom of its liquid-chamber and also provided with perforations below said flange and communicating with the liquid in the tank; a bell-shaped air-cylinder whose open end is submerged in the liquid of first-mentioned cylinder, and said second-mentioned cylinder having its closed end above first-mentioned cylinder; an air-inlet pipe supporting second-mentioned cylinder and entering near to the bottom of the condensation of first-mentioned cylinder; a gas-outlet pipe projecting above the level of the liquid in the tank; and a collapsible bag partially submerged in the liquid of the tank, surrounding said outlet-pipe and projecting above the top thereof.

6. In a carbureter, the combination of a tank adapted to contain a hydrocarbon liquid; a vent-pipe communicating with said tank; a liquid-fill pipe mounted within said vent-pipe and entering said tank; a bracket secured on the end of said fill-pipe within said tank; an arm pivoted on the projecting end of said bracket and carrying a ball-float; a cork disk secured on said arm, between its float and pivot center, and said disk arranged to form a valve in closing the mouth of said fill-pipe after the liquid has reached its proper level within the tank.

7. In a carbureter, the combination of a tank adapted to contain a hydrocarbon liquid; a carbureting-cylinder secured in the tank and comprising two shells concentric to each other and whose upper ends are open and extending above the liquid in the tank, and a circular flange partition secured to the shells and provided with port-openings communicating with a liquid-chamber, formed by the shells each side of said partition, and one of the shells of said carbureting-cylinder provided with perforations below the partition and communicating with the liquid in the tank; cork disk valves having each a stem to enter through each port-opening of the partition of said carbureting-cylinder; means to retain said valves in place upon the partition of said carbureting-cylinder; a pipe entering near to the bottom of the center shell of said carbureting-cylinder and adapted to receive air under pressure; a bell-shaped air-cylinder whose closed end is secured on said pipe, above the open ends of the shells of first-mentioned cylinder, and said second-mentioned cylinder projecting in the liquid-chamber of first-mentioned cylinder, so as to form a seal by the liquid therein; a gas-outlet pipe projecting above the liquid in the tank; and a collapsible bag supported from the top of the tank, surrounding said outlet-pipe, and said bag having its lower portion submerged in the liquid of the tank.

In testimony whereof I have signed my name to this specification in the presence of two subscribing witnesses.

ANDERS AKESON

Witnesses:
JOHN P. BYRNE,
E. E. FEENEY.